United States Patent [19]

Sakurai

[11] Patent Number: 5,012,430
[45] Date of Patent: Apr. 30, 1991

[54] FUZZY INFERENCE-BASED DIGITAL CONTROL METHOD AND APPARATUS

[75] Inventor: Akito Sakurai, Hachioji, Japan

[73] Assignee: Hitachi, Ltd., Tokyo, Japan

[21] Appl. No.: 92,137

[22] Filed: Sep. 2, 1987

[30] Foreign Application Priority Data

Sep. 3, 1986 [JP] Japan ................................ 61-207275

[51] Int. Cl.⁵ .............................................. G06F 15/00
[52] U.S. Cl. .................................... 364/513; 364/148; 364/131
[58] Field of Search ................................ 364/148–151, 364/157–159, 162, 513, 131; 318/561

[56] References Cited

PUBLICATIONS

Outline of a New Approach to the Analysis of Complex Systems and Decision Processes; IEEE Trans. on Systems, Man, & Cybernetics; Zadeh; vol. SMC-3, No. 1, Jan. 1973.
An Analysis of Human Decision-Making in Cement Kiln control and the Implications for Automation; Int. J. Man-Machine Studies (1980) 12,11–23; I. G. Umbers and P. J. King.
Industrial Applications of Fuzzy Logic Control; Int. J. Man-Machine Studies (1980) 12,3–10; P. Martin Larsen.
A Retrospective View of Fuzzy Control Systems; Fuzzy Sets and Systems 14 (1984) 199–210; North-Holland; Richard M. Tong.
The Application of Fuzzy Control Systems to Industrial Processes; Automatica; vol. 13, pp. 235–242; Pergamon Press 1977; P. J. King et al.

*Primary Examiner*—Allen R. MacDonald
*Attorney, Agent, or Firm*—Antonelli, Terry, Stout & Kraus

[57] ABSTRACT

A fuzzy inference-based digital control method and apparatus wherein state variables of the controlled object are adopted as inputs thereof, and fuzzy inference computations are executed for the input variables taken as fuzzy variables to derive the control output value to be supplied to the controlled object by referring to predetermined implication rules and membership functions corresponding thereto. The inference rule is divided into an inference rule group for deriving a value representing the state of the controlled object from the measured value obtained from the controlled object and another succeeding inference rule group for deriving the control output value from the derived state value. These inference rule groups are successively used to execute the inference computation in a multistep manner. An optimum control value for the controlled object is obtained with easy tuning.

11 Claims, 8 Drawing Sheets

FIG. 4

| No. | X1 | X2 | X3 | X4 | Z |
|---|---|---|---|---|---|
| 39 | LARGE | LARGE | — | — | HIGH |
| 38 | LARGE | MEDIUM | — | — | HIGH |
| 37 | LARGE | SMALL | MEDIUM | LITTLE | RATHER HIGH |
| 36 | LARGE | SMALL | LOW | MEDIUM | RATHER HIGH |
| 35 | LARGE | SMALL | LOW | LITTLE | RATHER HIGH |
| 34 | MEDIUM | LARGE | MEDIUM | LOW | RATHER HIGH |
| 33 | MEDIUM | LARGE | LOW | MEDIUM | RATHER HIGH |
| 32 | MEDIUM | LARGE | LOW | LITTLE | RATHER HIGH |
| 31 | LARGE | SMALL | HIGH | LITTLE | RATHER HIGH |
| 30 | MEDIUM | LARGE | HIGH | LITTLE | RATHER HIGH |
| 29 | LARGE | SMALL | LOW | MANY | RATHER HIGH |
| 28 | LARGE | SMALL | HIGH | MEDIUM | RATHER HIGH |
| 27 | LARGE | SMALL | MEDIUM | MEDIUM | RATHER HIGH |
| 26 | MEDIUM | LARGE | LOW | MANY | RATHER HIGH |
| 25 | MEDIUM | LARGE | HIGH | MEDIUM | RATHER HIGH |
| 24 | MEDIUM | LARGE | MEDIUM | MEDIUM | RATHER HIGH |
| 23 | LARGE | SMALL | HIGH | MANY | MEDIUM |
| 22 | LARGE | SMALL | MEDIUM | MANY | MEDIUM |
| 21 | MEDIUM | LARGE | HIGH | MANY | MEDIUM |
| 20 | MEDIUM | LARGE | MEDIUM | MANY | MEDIUM |
| 19 | MEDIUM | MEDIUM | MEDIUM | LITTLE | MEDIUM |
| 18 | MEDIUM | MEDIUM | LOW | MEDIUM | MEDIUM |
| 17 | MEDIUM | MEDIUM | LOW | LITTLE | MEDIUM |
| 16 | MEDIUM | SMALL | MEDIUM | LITTLE | MEDIUM |
| 15 | MEDIUM | SMALL | LOW | MEDIUM | MEDIUM |
| 14 | MEDIUM | SMALL | LOW | LITTLE | MEDIUM |
| 13 | MEDIUM | MEDIUM | HIGH | LITTLE | MEDIUM |
| 12 | MEDIUM | SMALL | HIGH | LITTLE | MEDIUM |
| 11 | MEDIUM | MEDIUM | HIGH | MEDIUM | LOW |
| 10 | MEDIUM | MEDIUM | MEDIUM | MEDIUM | LOW |
| 9 | MEDIUM | MEDIUM | LOW | MANY | LOW |
| 8 | MEDIUM | SMALL | HIGH | MEDIUM | LOW |
| 7 | MEDIUM | SMALL | MEDIUM | MEDIUM | LOW |
| 6 | MEDIUM | SMALL | LOW | MANY | LOW |
| 5 | MEDIUM | MEDIUM | HIGH | MANY | LOW |
| 4 | MEDIUM | MEDIUM | MEDIUM | MANY | LOW |
| 3 | MEDIUM | SMALL | HIGH | MANY | LOW |
| 2 | MEDIUM | SMALL | MEDIUM | MANY | LOW |
| 1 | SMALL | — | — | — | LOW |
|  | IF | | | | THEN |

FIG. 5

| No. | IF | | THEN |
|---|---|---|---|
| | Y1 | Y2 | Z |
| 17 | SMALL | — | LOW |
| 18 | MEDIUM | SOFT | LOW |
| 19 | MEDIUM | MEDIUM | LOW |
| 20 | MEDIUM | RATHER HARD | MEDIUM |
| 21 | MEDIUM | HARD | MEDIUM |
| 22 | RATHER LARGE | SOFT | MEDIUM |
| 23 | RATHER LARGE | MEDIUM | RATHER HIGH |
| 24 | RATHER LARGE | RATHER HARD | RATHER HIGH |
| 25 | RATHER LARGE | HARD | RATHER HIGH |
| 26 | LARGE | — | HIGH |

| No. | IF | | | | THEN | |
|---|---|---|---|---|---|---|
| | X1 | X2 | X3 | X4 | Y1 | Y2 |
| 1 | SMALL | — | — | — | SMALL | — |
| 2 | MEDIUM | SMALL | — | — | MEDIUM | — |
| 3 | MEDIUM | MEDIUM | — | — | MEDIUM | — |
| 4 | MEDIUM | LARGE | — | — | RATHER LARGE | — |
| 5 | LARGE | SMALL | — | — | RATHER LARGE | — |
| 6 | LARGE | MEDIUM | — | — | LARGE | — |
| 7 | LARGE | LARGE | — | — | LARGE | — |
| 8 | — | — | LOW | LITTLE | — | HARD |
| 9 | — | — | LOW | MEDIUM | — | HARD |
| 10 | — | — | LOW | MANY | — | RATHER HARD |
| 11 | — | — | MEDIUM | LITTLE | — | HARD |
| 12 | — | — | MEDIUM | MEDIUM | — | MEDIUM |
| 13 | — | — | MEDIUM | MANY | — | SOFT |
| 14 | — | — | HIGH | LITTLE | — | RATHER HARD |
| 15 | — | — | HIGH | MEDIUM | — | MEDIUM |
| 16 | — | — | HIGH | MANY | — | SOFT |

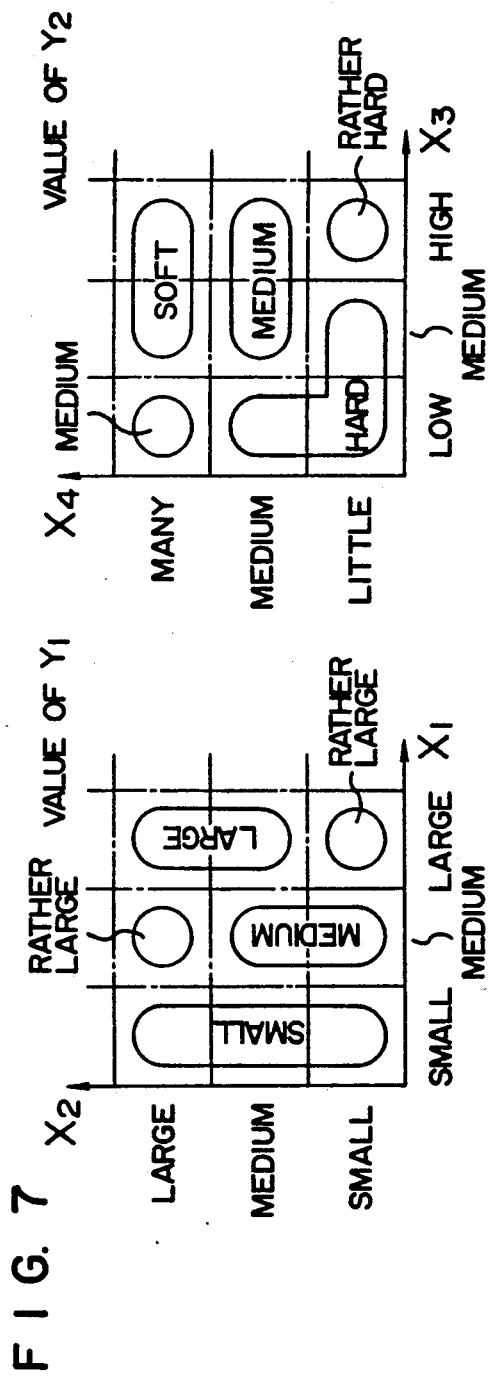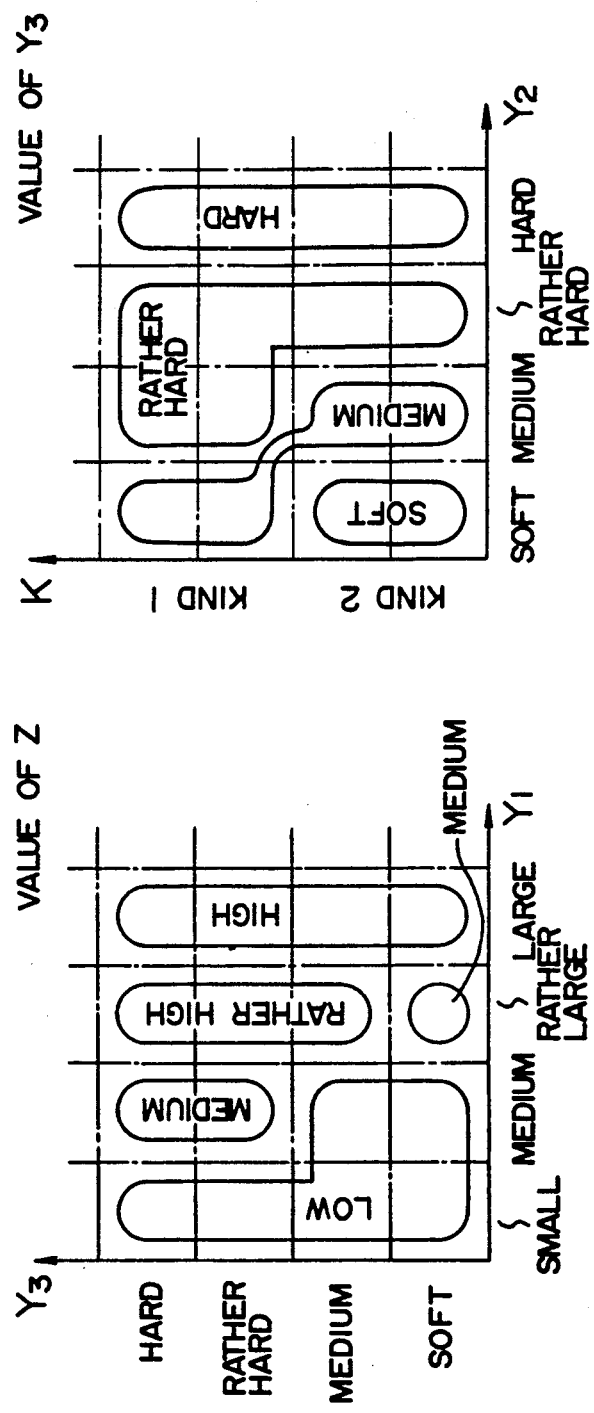
FIG. 7

FIG. 8

| No. | X1 | X2 | X3 | X4 | Y1 | Y2 |
|---|---|---|---|---|---|---|
| | IF | | | | THEN | |
| 1 | SMALL | — | — | — | SMALL | — |
| 2 | MEDIUM | SMALL | — | — | MEDIUM | — |
| 3 | MEDIUM | MEDIUM | — | — | MEDIUM | — |
| 4 | MEDIUM | LARGE | — | — | RATHER LARGE | — |
| 5 | LARGE | SMALL | — | — | RATHER LARGE | — |
| 6 | LARGE | MEDIUM | — | — | LARGE | — |
| 7 | LARGE | LARGE | — | — | LARGE | — |
| 8 | — | — | LOW | LITTLE | — | HARD |
| 9 | — | — | LOW | MEDIUM | — | HARD |
| 10 | — | — | LOW | MANY | — | RATHER HARD |
| 11 | — | — | MEDIUM | LITTLE | — | HARD |
| 12 | — | — | MEDIUM | MEDIUM | — | MEDIUM |
| 13 | — | — | MEDIUM | MANY | — | SOFT |
| 14 | — | — | HIGH | LITTLE | — | RATHER HARD |
| 15 | — | — | HIGH | MEDIUM | — | MEDIUM |
| 16 | — | — | HIGH | MANY | — | SOFT |

| No. | Y1 | Y3 | Z |
|---|---|---|---|
| | IF | | THEN |
| 17 | SMALL | — | LOW |
| 18 | MEDIUM | SOFT | LOW |
| 19 | MEDIUM | MEDIUM | LOW |
| 20 | MEDIUM | RATHER HARD | MEDIUM |
| 21 | MEDIUM | HARD | MEDIUM |
| 22 | RATHER LARGE | SOFT | MEDIUM |
| 23 | RATHER LARGE | MEDIUM | RATHER HIGH |
| 24 | RATHER LARGE | RATHER HARD | RATHER HIGH |
| 25 | RATHER LARGE | HARD | RATHER HIGH |
| 26 | LARGE | — | HIGH |

| No. | Y2 | K | Y3 |
|---|---|---|---|
| | IF | | THEN |
| 27 | SOFT | — | MEDIUM |
| 28 | SOFT | 2 | SOFT |
| 29 | MEDIUM | — | RATHER HARD |
| 30 | MEDIUM | 2 | MEDIUM |
| 31 | RATHER HARD | — | RATHER HARD |
| 32 | HARD | — | HARD |

FUZZY INFERENCE-BASED DIGITAL CONTROL METHOD AND APPARATUS

BACKGROUND OF THE INVENTION

The present invention relates to a fuzzy inference-based digital control method and its apparatus and in particular to a fuzzy inference-based digital control method and its apparatus useful to process control applications.

With the development of digital computers, automated control using DDC (direct digital control) has become popular. However, manipulation conducted by human operators could not be automated.

In recent years, however, fuzzy control using a fuzzy proposition (a proposition which is fuzzy in correctness such as the proposition that "X is large") and an implication rule (IF-THEN statement) to represent the operator's thinking and to use them as control rules has been attempted.

A practical technique of inference in this fuzzy control and generation of fuzzy control rules are described in detail in Japanese paper, "Measurement and Control", vol. 22, No. 1, pp. 84 to 86.

The basic concept of fuzzy control is disclosed in L.A. Zadeh, "Outline of a New Approach to the Analysis of Complex Systems and Decision Process", IEEE Trans. SMC-3, 28/44, 1973. The definition of terms used herein conforms to this paper.

Application of this concept to the process is disclosed in P.M. Larsen: "Industrial Application of Fuzzy Logic Control", Int. J. Man-Machine Studies, 12, 3–10, 1980 and L.G. Umbers and King: "Analysis of Human Decision-Making in Cement Control and the Implications for Automation", Int. J. Man-Machine Studies, 12, 11–23, 1980, for example.

In case of the prior art as disclosed in the aforementioned Japanese Paper, the expressible inference rule is limited to an inference rule of recognition-action type based on an IF-THEN statement of a single step expressed as "IF the measurement is A THEN output B".

However, the inference performed by the operator usually comprises two steps of:

(i) Estimating the value of an attribute of a controlled object represented by unmeasurable variables (such as material jam, a value of which has an expression like large or small) in accordance with a certain model of the controlled object on the basis of measured values of the pressure, temperature, water quality or the like in the process control; and (ii) deriving the output value to the controlled object by applying a relationship defined on the basis of an empirical rule onto the resultant estimated attribute value.

In such a case, respective inference rules can be represented as:

(iii) IF the measured value is A THEN the state variable value is C; and (iv) IF the state variable value is D THEN output B.

These expressions do not conform to the expression method of the prior art. By examining the input-to-output relations of the inference rules having forms (i) and (ii), therefore, those inference rules must be united into an IF-THEN statement of a single step with the state variables omitted.

However, such unification causes problems as follows:

(1) The conclusion which should be originally obtained by chaining inferences (in two steps in case of the above described (i) and (ii)) is expressed by inference of a single step. Therefore, the logical linkage between the first supposition (IF ~) and the last result (output ~) becomes obscure. That is to say, the reason or guarantee why the conclusion is obtained from the supposition becomes obscure. Tuning of the inference rule and verification of the correctness thus becomes difficult.

(2) The number of inference rules is increased.

SUMMARY OF THE INVENTION

An object of the present invention is to provide a fuzzy inference-based digital control method and its apparatus capable of expressing the multistep type inference logic as it is and clearly by a smaller number of inference rules.

Another object of the present invention is to provide a fuzzy inference-based digital control method and apparatus facilitating the tuning or vertification of inference rules.

A further object of the present invention is to provide digital control of fuzzy control type capable of separately expressing inference rules for deriving values representing the state of the controlled object from measured values in process control and an inference rule for deriving control values from them.

In accordance with the concept of the present invention, these objects are attained as follows. In a digital control method including the steps of adopting as the inputs the state variable values of the controlled object, or the above described state variable values and variable values computed from the above described state variable values, computing an output variable in accordance with fuzzy inference including a computation method for applying an implication rules to the above described input variable values taken as the value of fuzzy variables, and applying the output variable value thus computed to the controlled object, firstly an output variable value for the input variable value is derived from one group of implication rules, and secondly the output variable value thus obtained is applied as at least a part of the input variable value of implication rules of another group, whereby a further fuzzy inference is performed.

In the above described structure, an inference computation unit for deriving the output variable value by referring to the input variable value, a membership function, and respective inference rules derives at first the output variable value by referring to the input variable value, the membership function and the inference rules of the first group. The output variable value is referred to as output of the first group. Succeedingly, the inference computation unit regards the output variable of the first group also as a part of the input variable to the inference rules of the second group, and derives an output variable value by referring to the original input variable value, the membership function and the inference rules of the second group. The output variable value is referred to as the output of the second group. Finally, the output of the first group and the output of the second group are outputted collectively. In this way, multistep inference rules are successively carried out to derive the final output variable value.

By making the inference rules operating as described in (i) the first group and making the inference rules operating as described in (ii) the second group, the inference to the operator can be represented as it is and the inference computation unit can carry out this.

BRIEF DESCRIPTION OF THE DRAWINGS

FIG. 4 represents the operation rule of FIG. 3 as a fuzzy inference rule in accordance with the prior art.

FIG. 5 represents the operation rule of FIG. 3 as a fuzzy inference rule in accordance with the present invention.

FIG. 7 shows the operator's operation rule of the plant in the embodiment of FIG. 6.

FIG. 8 represents the operation rule of FIG. 7 as a fuzzy inference rule in accordance with the present invention.

DESCRIPTION OF THE PREFERRED EMBODIMENTS

An embodiment of fuzzy inference-based digital control according to the present invention will be described.

Figure 1:
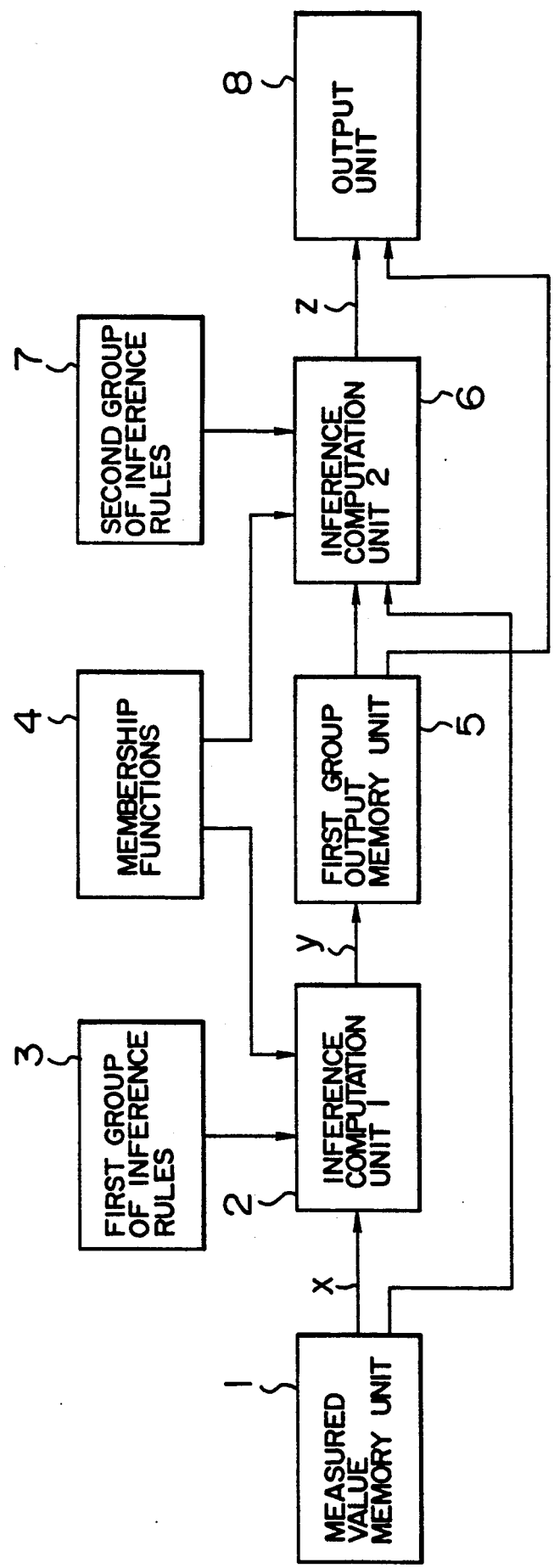
FIG. 1 is a block diagram illustrating an embodiment of a fuzzy inference-based digital control system according to the present invention.

FIG. 1 is a block diagram of an embodiment of a digital control unit realizing the method of the present invention. Numeral 1 denotes a unit for storing therein present measured values obtained by measuring the controlled object, past measured values during operation, and modified values such as smoothed values or normalized values computed from the present and past measured values. Numeral 3 denotes a first group inference memory unit for storing therein inference rules of the first group, i.e., a plurality of IF-THEN statements. Numeral 7 denotes a second group inference rule memory unit for storing therein the inference rule of the second group, i.e., a plurality of IF-THEN statements. Numeral 4 denotes a memory unit for storing therein a set of a plurality of membership functions of all variables prepared on the basis of an empirical law.

The measured value is acquired from the controlled object at a sampling period specifically determined and stored into the memory unit 1. A first computation unit or inference execution unit 2 performs computation for inference execution at a predetermined computation period.

In general, the measured values used for fuzzy control often have poor measurement precision or contain large noises. Therefore, the computation period is determined to be 10 times or more the sampling period, and the measured values undergo smoothing processing.

Necessary measured values (and their modified values) are taken out from the memory unit 1 at first. The degree of correctness of a fuzzy proposition included in the inference rule relating to the first group stored in the memory unit 3 is derived by referring to the membership function taken out from the memory unit 4. In accordance with the pertinent membership function and variable, the inference rule stored in the memory unit 3 is applied and carried out to compute the output of the first group. The output of the first group is temporarily stored in the memory unit 5.

After the inference computation of the first group performed by the first computation unit 2 has been finished, execution of the inference computation of the second group is started. With the output of the first group stored in the first group output memory unit 5 and the value stored in the measured value memory unit 1 taken as the input values, the inference computation based on the inference rule of the second group stored in the second group inference rule memory unit 7 is executed in the second computation unit 6 by referring to the corresponding membership function stored in the memory unit 4. The output value of the second computation unit 6 is sent to the output unit 8. By using the output value of the first group and the output value of the second group, the output unit 8 produces the output destined for the controlled object, i.e., the control signal for directing the actuator in accordance with predetermined computation formulas including conversion of unit systems.

Among blocks of the above described controller, blocks 1 to 4 include implementation means as described in the aforementioned paper written by Larsen and paper written by Umbers et al. and are well known. For example, the block 2 includes a CPU or a MPU, and blocks 3 and 4 include a ROM or a RAM storing a table of a plurality of IF-THEN statements and a table of membership functions, respectively. Other similar blocks include like components. However, respective inference computation units can be used in common by using the software.

When the model of the controlled object is so complex that it cannot be expressed by a group of inference rules, it can also be divided into a plurality of groups. It will be understood that successive inference computation may be performed as described above for each of a plurality of divided groups.

Figure 2:
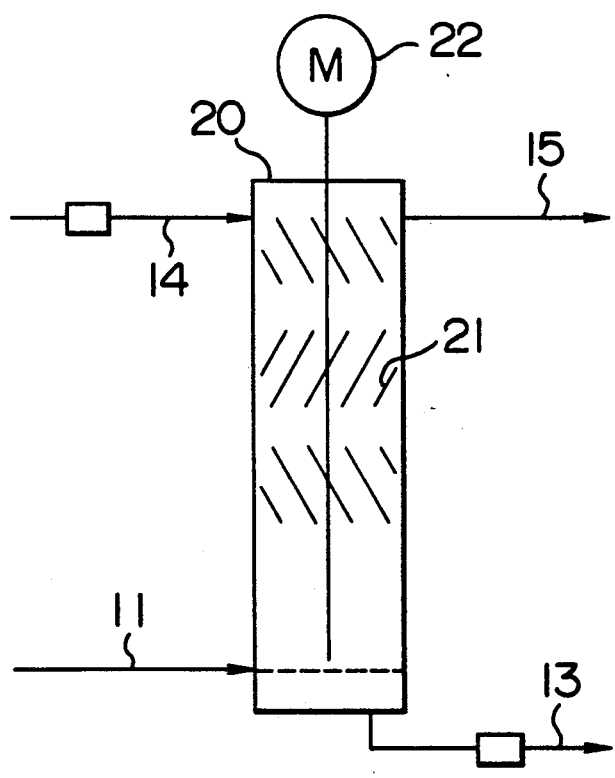
FIG. 2, shows an embodiment of the present invention applied to a plant.

FIG. 2 shows an example of plant control system for beet sugar extraction with the present invention applied thereto.

It is now assumed that the controlled object is sugar manufacturing process provided with an extraction tower 20 for extracting sugar extractant from a raw material 11 such as beet cut in long strip form by using warm water as extraction liquid 14. The raw material 11 is pushed into the extraction tower 20 at its lower part. The extractant is extracted by the extraction liquid 14 injected from the upper part. The resultant residuum 15 is discharged from the upper part of the extraction tower 20. In order to push up the raw material from the lower part of the extraction tower 20 to the upper part thereof, blades 21 are disposed at the center of the tower and rotated by a motor 22. While the extraction liquid 14 falls from the upper part of the extraction tower 20 to the lower part thereof, the extractant dissolves to be taken out from the lower part as a solution 13.

The object of the control for this process is to fix the amount of the raw material in flow at a constant value and operate the tower so as not to cause excessive jam in the tower.

The operation rule for achieving this object is derived on the basis of the empirical law of the operators of such process as described below. At first, variables and fuzzy set names (referred to as fuzzy variables, fuzzy labels or linguistic values) whereto values of the variables can belong are as follows.

X1: Electric power required for rotating the blade driving motor 22. Three kinds of fuzzy sets; small, medium and large are used.

X2: "Flow rate of extraction liquid" - "flow rate of solution". Three kinds of fuzzy sets; small, medium and large are used.

X3: Average temperature when the raw material grows. Three kinds of fuzzy sets; low, medium and high are used.

X4: The amount of rainfall when the raw material grows. Three kinds of fuzzy sets; little, medium and many are used.

Y1: Jam in the tower. Four kinds of fuzzy sets; small, medium, rather large and large are used.

Y2: Softness of the raw material. Four kinds of fuzzy sets; soft, medium, rather hard and hard are used.

Z: The rate of revolutions of the motor 22. Four kinds of fuzzy sets; low, medium, rather high and high are used.

The operation rules possessed by the operation operating the extraction tower as know-how or expert knowledge can be roughly expressed as follows:

(1) The larger the motor power (X1) and the larger the flow rate difference (X2), the larger the jam (Y1).

(2) The higher the temperature (X3) and the more the amount of rainfall (X4), the higher the softness (Y2).

(3) The larger the jam (Y1) and the harder the softness (Y2), the higher the number of revolutions (Z).

Figure 3:
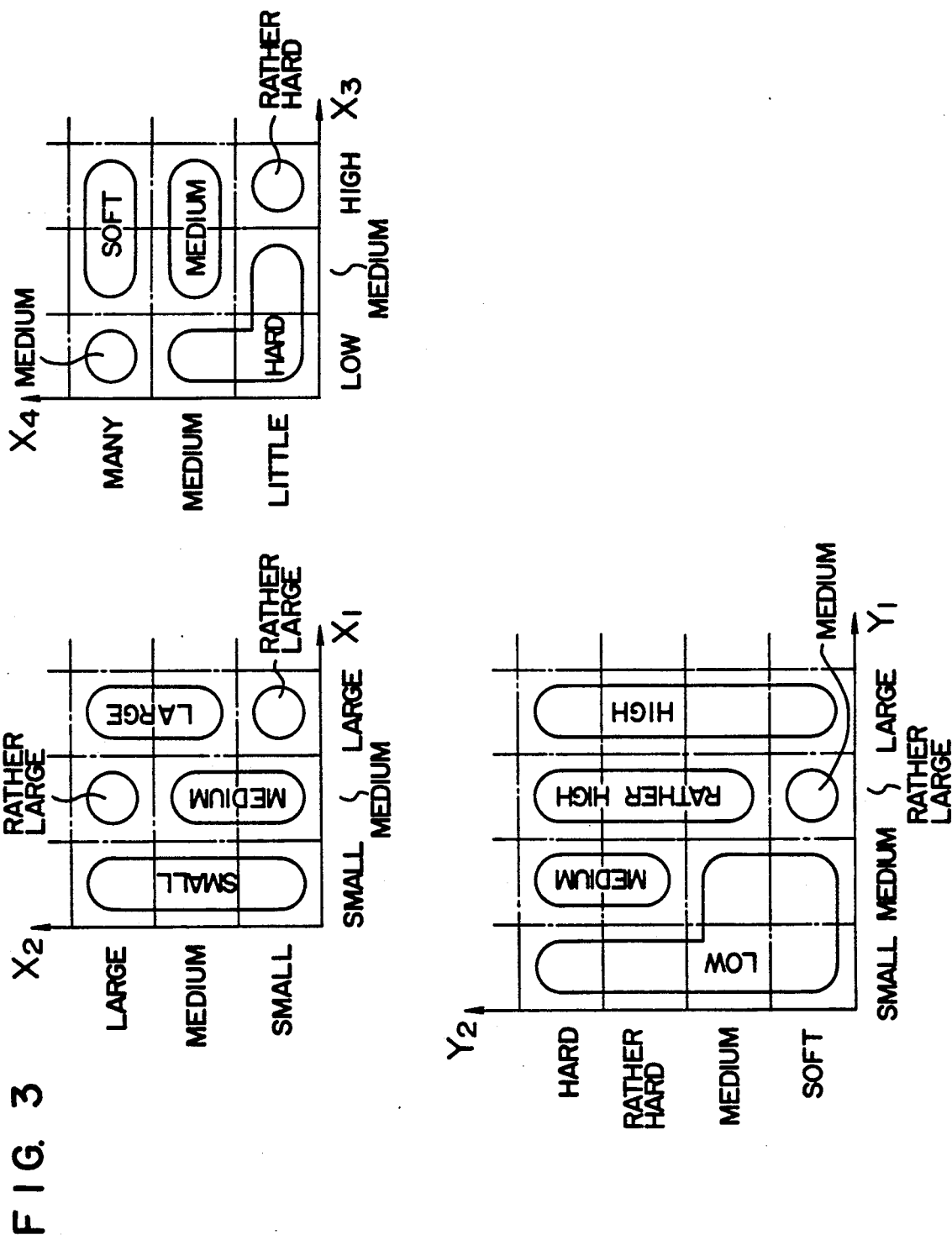
FIG. 3 shows the operator's operation rule of the plant illustrated in FIG. 2.

FIG. 3 diagrammatically shows the above described relations (1) to (3) in more detail.

This relation is rewritten by using only the relation between the input variables and the output variables without interposing Y1 and Y2. FIG. 4 shows the relation thus rewritten in the form of fuzzy inference rules by using single-step IF-THEN statements in accordance with the prior art. Each column represents one IF-THEN statement (rule). For example, the column third from the left represents the rule: "IF X1 is medium, X2 is small, X3 is medium and X4 is large THEN Z is low."

FIG. 5 shows the same know-how represented by inference rules in accordance with the method of the present invention. In the same way as FIG. 4, each column represents an inference rule. For example, No. 2 represents the rule:

"IF X1 is medium and X2 is small THEN Y1 is medium."

While the prior art requires 39 rules for representing the know-how, it can be described with 26 rules in the embodiment of the present invention. Further, in the rule expression of the prior art, four variables appear in the IF-part with the exception of Nos. 1, 38 and 39 of FIG. 4. Meanwhile, only two variables appear in the IF-part in case of the rule expression according to the present embodiment. Therefore, the application of the present invention facilitates the expression understanding. Since intermediate variables Y1 and Y2 are interposed in case of the present invention, the relation between the input variables X1, X2, X3 and X4 and the output variable Z can be understood more easily.

Another embodiment of the present invention in which fuzzy inference is performed in three steps will now be described by referring to FIGS. 6 to 8. The same numerals and symbols as those of the embodiment described before denote identical components.

Figure 6:
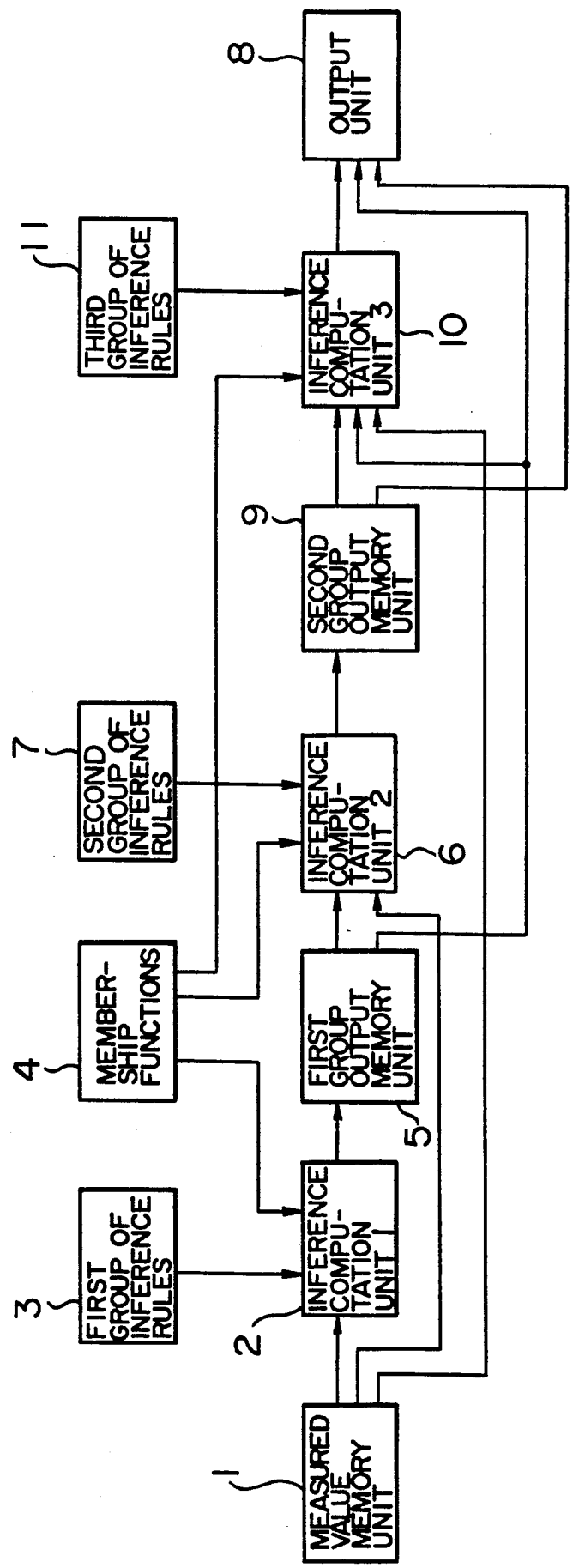
FIG. 6 is a block diagram illustrating another embodiment of the present invention performing three-step fuzzy inference.

FIG. 6 shows a digital control unit substantially developed from the unit of FIG. 1. In FIG. 6, numeral 9 denotes a second group output memory unit for storing therein the result of the inference computation of the second group. Numeral 10 denotes a third group inference computation unit provided with outputs of the measured value memory unit 1, the first group output memory unit 5 and the second group output memory unit 9 as three inputs thereof. After the completion of the second inference computation, the third group inference computation unit 10 performs the inference computation of the third group by referring to the pertinent membership function supplied from the membership function memory unit 4 and the inference rule of the third group. Numeral 11 denotes a third group inference rule memory unit for storing the inference rule of the third group succeeding that of the second group.

On the basis of outputs of the third group inference computation unit 10, the first group output memory unit 5 and the second group output memory unit 9, the output unit 9 generates the control signal to be supplied to the actuator for operating the controlled object as illustrated.

In such digital control including multistep inference computation, each inference rule group is defined by dividing the inference process based upon the IF-THEN rule and the membership function representing the model of the process characteristics in accordance with the empirical law.

An example of application of the three-step fuzzy inference digital control unit will now be described as an advanced form of the application to the plant as shown in FIGS. 2 to 5 by referring to FIGS. 7 and 8.

In FIG. 7 relating to the operation rule and FIG. 8 showing the operation rule rewritten in the form of the inference rule, there are two kinds of raw materials, which exhibit different softness for identical temperature and amount of rainfall.

Fuzzy variables and fuzzy set names whereto the values of fuzzy variables belong are as follows.

$X_1$, $X_2$, $X_3$, $X_4$, $Y_1$ and $Z_1$ are the same as those of the above described embodiment.

Y2: "Virtual value" representing the softness of the raw material. It is an intermediate variable for deriving Y3 which represents the "actual value" of the softness. As fuzzy set names, four kinds of soft, medium, rather hard and hard are used.

K: It represents the kind of the raw material. As fuzzy set names, two kinds 1 and 2 are used.

In digital control using fuzzy inference in accordance with the present invention as described above, the fuzzy inference rule for deriving the output value controlling the controlled object can be separated into an inference rule for deriving the value representing the state of the controlled object from the measured value and another inference rule for deriving the control value therefrom. Therefore, the model is explicitly expressed in the inference rule, and the meaning of the inference rule becomes clear. In addition, the inference rule is simplified.

I claim:

1. In a digital control method including the steps of taking measurable state variable values of a controlled object as inputs or said state variable values and values computed from said state variables as inputs, computing values of fuzzy variables obtained from implication rules for fuzzy interference, expressed in the form of conditional statements, using said input variables as fuzzy variables, and controlling said controlled object according to the result of said computing, a fuzzy inference-based digital control method comprising, in said computing step:

a first step of computing fuzzy variables representing the state of the controlled object on the basis of selected ones of input measurable variable values in accordance with predetermined implication rules of a group regarding attributes of said controlled object; and a second step of computing control variable values for the controlled object from inputs including at least the fuzzy variables determined by said first step, in accordance with predetermined implication rules of another group regarding a control output to be applied to the controlled object.

2. A fuzzy inference-based digital control method according to claim 1, wherein said implication rules of the first group are so prepared together with associated membership functions on the basis of an empirical law that unmeasurable variables representing attributes of the controlled object may be inferred from input state variable values, and wherein said implication rules of another group are so prepared together with associated membership functions on the basis of an empirical law that the output variable values sent to the controlled object may be derived from the attribute values of said controlled object.

3. A fuzzy inference-based digital control method according to claim 2, wherein each of the implication rules of said first group and said other group includes a plurality of IF-THEN statements.

4. A digital control method according to claim 1, wherein sets of inference rule groups and membership functions are stored in first and second storage means and include programs which are rewritable on the basis of control results supplied to the controlled object.

5. A method for applying digital control onto a controlled object on the basis of fuzzy inference, comprising:

a first step of inputting state variable values of the controlled object;

a second step of performing fuzzy inference computations to derive output variable values by making said input state variables into fuzzy variables and by referring to implication rules of a first group relating to attributes of the controlled object and corresponding membership functions associated with input variables;

a third step of using said output variable values as at least part of input fuzzy variable values of implication rules of the next group relating to a control output value to be applied to the controlled object and for deriving output variable values of said next group by performing fuzzy inference computations with respect to the implication rules of said next group and membership functions corresponding to input variables; and a fourth step of deriving a control value to be applied to the controlled object on the basis of the output values of said first group and output values of said next group.

6. A digital control method according to claim 5, wherein the state variables of the controlled object include a plurality of kinds, and wherein said third step receives as another input at least a state variable of the controlled object which differs in kind from the input state variables of said second step.

7. A digital control method according to claim 6, further comprising the step of tuning said plurality of implication rules and membership functions to desired values on the basis of the result of the controlled object responding to the control output value derived at the fourth step.

8. A digital control method according to claim 5, wherein at least one of the second step and the third step further includes implication rules and membership functions of a plurality of subgroups, and cascade inference operations are executed for respective subgroups.

9. A digital control method according to claim 5, wherein the fuzzy inference rule group in the second step is so set beforehand as to derive the value representing the state of the controlled object, and the fuzzy inference rule group at the third step is so set beforehand as to derive the output value controlling the controlled object on the basis of the inferred value of the state value of the second step.

10. A digital control apparatus for controlling a controlled object on the basis of fuzzy inference, comprising:

input means for supplying measured values relating to the controlled object;

first storage means for storing therein inference rules of a first group preset in order to infer the states of the controlled object and membership functions associated with input variables;

first inference computation means for performing fuzzy inference computations with respect to the measured values supplied from said input means to derive state variables of the controlled object by referring to said inference rules and membership functions of the first group taken out from said first storage means;

second storage means for storing therein inference rules of a second group preset in order to infer control values for the controlled object on the basis of the state variables; and second inference computation means, coupled to the output of said first inference computation means, for performing fuzzy inference computations with respect to at least the output values of said first inference computation means to derive control output values of the controlled object by referring to said inference rules and membership functions of the second group taken from said second storage means.

11. A digital control apparatus according to claim 10, wherein said input means includes means for temporarily holding a plurality of kinds of measured values measured from the controlled object, and said input means supplies a measured value of a kind different from that of the measured value inputted to said first inference computation means to said second inference computation means.

state variable holding means for temporarily holding the outputs of said first inference computation means is coupled between said first inference computation means and said second inference computation means, and output means connected to receive the outputs of said first variable holding means and the outputs of said second inference computation means for supplying said outputs as control outputs to the controlled object.

* * * * *